(12) United States Patent
Sekiguchi et al.

(10) Patent No.: US 8,028,184 B2
(45) Date of Patent: Sep. 27, 2011

(54) DEVICE ALLOCATION CHANGING METHOD

(75) Inventors: Tomoki Sekiguchi, Sagamihara (JP); Sachie Tajima, Kawasaki (JP); Hidetoshi Sato, Ebina (JP)

(73) Assignee: Hitachi, Ltd., Tokyo (JP)

( * ) Notice: Subject to any disclaimer, the term of this patent is extended or adjusted under 35 U.S.C. 154(b) by 621 days.

(21) Appl. No.: 12/132,406

(22) Filed: Jun. 3, 2008

(65) Prior Publication Data
US 2008/0307213 A1 Dec. 11, 2008

(30) Foreign Application Priority Data

Jun. 6, 2007 (JP) ................................ 2007-149881

(51) Int. Cl.
G06F 1/00 (2006.01)
G06F 9/32 (2006.01)
G06F 9/455 (2006.01)
G06F 9/46 (2006.01)
(52) U.S. Cl. .............................. 713/323; 718/1; 718/104
(58) Field of Classification Search .................. 713/320, 713/321, 340; 718/1, 104
See application file for complete search history.

(56) References Cited

U.S. PATENT DOCUMENTS

| | | | | |
|---|---|---|---|---|
| 4,887,202 A | * | 12/1989 | Tanaka et al. | 703/21 |
| 5,506,975 A | * | 4/1996 | Onodera | 718/1 |
| 6,496,847 B1 | * | 12/2002 | Bugnion et al. | 718/1 |
| 6,681,267 B2 | * | 1/2004 | Ohmura et al. | 710/8 |
| 7,203,814 B2 | * | 4/2007 | Serizawa et al. | 711/202 |
| 7,281,102 B1 | * | 10/2007 | Agesen et al. | 711/163 |
| 7,644,407 B2 | * | 1/2010 | Cowperthwaite et al. | 718/1 |
| 7,805,723 B2 | * | 9/2010 | Lowell | 718/1 |

OTHER PUBLICATIONS

"AMD I/O Virtualization Technology (IOMMU) Specification," pp. 14, "2.2.5 Virtual Machin Guest Access to Devices," [online], Feb. 2006 Issue, AMD (USA), Retrieved on Jul. 24, 2006, Internet URL: http://www.amd.com/usen/assets/content_type/white_papers_and_tech_docs/34434.pdf.

* cited by examiner

Primary Examiner — Thomas Lee
Assistant Examiner — Phil Nguyen
(74) Attorney, Agent, or Firm — McDermott Will & Emery LLP

(57) ABSTRACT

Switching of the allocation of a device to a guest OS is implemented through transmission of a virtual suspension interrupt to a guest OS in a VMM; a power control notification process module that causes the guest OS to start a return process from a suspended state; a guest power process module that traps a suspension process of the guest OS; an I/O configuration change process module that updates a logical device definition of the VMM in the suspended state of the guest OS; a guest I/O emulation process module that emulates an I/O instruction that is issued by an I/O reconfiguration process module and that is executed when the guest OS has returned from the suspended state, thereby to provide a new logical device configuration to the guest OS.

10 Claims, 9 Drawing Sheets

LOGICAL DEVICE TABLE CORRESPONDING TO FIG.2A

| GUEST | LOGICAL DEVICE | LOGICAL I/O ADDRESS | ALLOCATION METHOD | PHYSICAL DEVICE | RE-INITIALIZATION DATA |
|---|---|---|---|---|---|
| GUEST 1 | DISK ADAPTER 1 | 100 | DIRECT | DISK ADAPTER 104 | MAC = AAAAA |
|  | NETWORK ADAPTER 1 | 200 | DIRECT | NETWORK ADAPTER 106 | Port ID = BBBB |
| GUEST 2 | DISK ADAPTER 2 | 300 | DIRECT | DISK ADAPTER 105 | MAC = CCCCC |
|  | NETWORK ADAPTER 2 | 400 | DIRECT | NETWORK ADAPTER 107 | Port ID = DDDD |

LOGICAL DEVICE TABLE CORRESPONDING TO FIG.2B

| GUEST | LOGICAL DEVICE | LOGICAL I/O ADDRESS | ALLOCATION METHOD | PHYSICAL DEVICE | RE-INITIALIZATION DATA |
|---|---|---|---|---|---|
| GUEST 1 | DISK ADAPTER 1 | 100 | EMULATION | DISK ADAPTER 104 | MAC = AAAAA |
|  | NETWORK ADAPTER 1 | 200 | EMULATION | NETWORK ADAPTER 106 | Port ID = BBBB |
| GUEST 2 | DISK ADAPTER 2 | 300 | DIRECT | DISK ADAPTER 105 | MAC = CCCCC |
|  | NETWORK ADAPTER 2 | 400 | DIRECT | NETWORK ADAPTER 107 | Port ID = DDDD |
| GUEST 3 | DISK ADAPTER 1 | 100 | EMULATION | DISK ADAPTER 104 | MAC = EEEEE |
|  | NETWORK ADAPTER 1 | 200 | EMULATION | NETWORK ADAPTER 106 | Port ID = FFFF |

CONTENTS OF CONFIGURATION CHANGE OF GUEST

| GUEST | LOGICAL DEVICE | ALLOCATION METHOD | PHYSICAL DEVICE | RE-INITIALIZATION DATA |
|---|---|---|---|---|
| GUEST 1 | DISK ADAPTER 1<br>NETWORK ADAPTER 2 | EMULATION<br>EMULATION | DISK ADAPTER 104<br>NETWORK ADAPTER 106 | MAC = XXXXXX<br>Port ID = XXXXXX |

DEVICE ALLOCATION CHANGING METHOD

The present application claims priority from Japanese application serial no. JP2007-149881, filed on Jun. 6, 2007, the content of which is hereby incorporated by reference into this application.

BACKGROUND OF THE INVENTION

1. Field of the Invention

The present invention relates to a method of executing, for example, a virtual machine and multiple guest operating systems through logical partitioning in a single computer. More particularly, the invention relates to a method of allocating a device(s) to the guest operating system.

2. Description of the Related Art

Techniques for configuring a virtual machine (VM) in a single computer to parallel execute multiple operating systems have begun to be popularly used. In a broad sense, the techniques each include two systems, a virtual machine system and a logical partition (LPAR) system. An operating system that is executed in these techniques, hereinbelow, will be referred to as a "guest OS."

In the virtual machine system, a control software product so-called "virtual machine monitor" ("VMM," hereinbelow) virtualizes special registers (control registers) controlling the operation of the hardware and processor of the computer, thereby creating multiple virtual machines. The guest OS runs in the respective virtual machine created by the VMM. More specifically, the VMM traps and emulates privileged instructions of the CPU (control processing unit), such as I/O (input/output) instructions for the execution of the guest OS and control register operations, thereby creating virtual machine environments. In the virtual machine system, the multiple guest OSs are enabled to share a sing I/O device. This is because an access to the virtual I/O device visible or recognizable from the guest OSs is trapped by the VMM, and the access is converted to an access to a real device and is emulated. Thereby, a flexible virtual machine environment low in dependency on the I/O device mounted in the computer.

In the execution of I/O control in the virtual machine system, overhead occurs since the VMM emulates an I/O operation performed by a respective guest OS (of a guest). In addition, since the VMM emulates also an I/O operation of an other guest OS running in the parallel execution, the overhead depends on the process of the other guest OS. Hence, there is a problem that it is difficult to carry out the performance prediction.

In the logical partition system, control software called "hypervisor" logically partitions computer resources thereby creating multiple computers. The hypervisor operates, for example, tables and registers that are referenced by a processor and other hardware, thereby logically partitioning the computer. The guest OS executes within a partition logically partitioned by the hypervisor. An instruction to be executed by the guest OS is not emulated and is directly executed by the processor. Hence, the guest OS is less likely to be influenced by an other guest OS executing in the same computer, whereby a virtual machine environment with high performance and high reliability can be realized. On the other hand, however, multiple virtual machines are created through partitioning of hardware resources, so that the I/O device cannot be shared by the multiple guest OSs. In the logical partition system, in order that the I/O device is shared among the guests, corresponding measurements have to be taken on the device side.

As described above, in the virtual machine system, virtual machines to be executed by the respective guest OSs are configured through emulation of privileged instructions; and in the logical partition system, the virtual machines OSs are configured through partitioning of the computer by the hypervisor.

Conventionally, techniques such as described above have been realized in a mainframe. This is attributed to the situation in which, in order to realize these techniques with high performance, special hardware resources, such as a processor corresponding to the virtual machine and mechanisms for executing emulation processes of the VMM by use of hardware, are necessary. However, with recent enhancement in processor performance, a sufficient performance can be obtained even from execution of processes such as described above in the processor. As a consequence, the systems, such as virtual machine and logical partition, have begun to be popularly employed for use with general computers other than mainframes.

The virtual machine system has a feature in that a guest OS in execution can be moved (migrated) into an other or distinct computer running through a VMM. As such, in a configuration formed such that the VMM in the migration destination emulate an I/O device necessary for the guest OS, the guest OS can be continually executed in the computer in the movement destination.

With the use of these techniques, high availability systems are implemented with the integration of systems running in martensite computers into a single computer, load balance associated with guest OS migration corresponding to the computer load, and guest OS migration in the event of computer failure.

Further, in the virtual machine system, there are implemented hardware mechanisms that enable direct operation of the I/O device from the guest OS. One of the mechanisms is an I/O address translation mechanism. Normally, when specifying data transfer by direct memory access ("DMA," hereinbelow) on the I/O device, the OS specifies a physical address of the data transfer destination to the I/O device. In the event that the OS runs in the virtual machine, the physical address specified by the guest OS is a physical address virtualized by the VMM, which is not a real address. On the other hand, however, a physical address space recognizable from the device is a real physical address space. The I/O address translation mechanism translates the transfer destination address of the DMA transfer in correspondence to the guest OS using the device, thereby enabling the data to be transferred to a physical address area allocated to the guest OS. As such, in the event that the I/O address translation mechanism is specified by the VMM in accordance with, for example, the configuration and memory allocation state of the guest OS, the guest OS is enabled to directly issue the I/O specification to the device even without knowing about the physical address. Such an I/O address translation mechanism has been realized (For example, refer to "AMD I/O Virtualization Technology (IOMMU) Specification," pp. 14, "2.2.5 Virtual Machine Guest Access to Devices," [online], February 2006 Issue, AMD (USA), Retrieved on Jul. 24, 2006, Internet URL:

http://www.amd.com/us-en/assets/content_type/white_papers_and_tech_docs/34434.pdf ).

Further, U.S. Pat. No. 4,887,202 discloses a switching method that switches an I/O device being used by a guest OS in a direct use mode to a VMM-emulation use mode or that conversely switches the I/O device being used in the VMM-emulation use mode to the mode of direct allocation to the guest OS.

SUMMARY OF THE INVENTION

In a device allocation method for allocating a device to the guest OS in the virtual machine, there is a problem in that it is difficult to switch between an emulation allocation mode and a direct allocation mode directly operable from the guest OS during a run mode of the guest OS. More specifically, when pending I/O processing remains in a device directly allocated to the guest, the device allocation to the guest OS cannot be changed. In a mainframe computer, since resources, such as an I/O and device, are standardized, operational states of the devices can be known through standard instructions, so that the device allocation can be changed during an inactive mode of the device. Generally, however, in normal computers other than the mainframe computers, such a device state such as described above cannot be known. Hence, it is difficult to change the device allocation.

The present invention implements as one of the embodiments change of the allocation of a device to a guest OS is implemented through transmission of a virtual suspension interrupt to a guest OS in a VMM; a power control notification process that causes the guest OS to start a return process from a suspended state; a guest power process that traps a suspension process of the guest OS; an I/O configuration change process that updates a logical device definition of the VMM in the suspended state of the guest OS; a guest I/O emulation process that emulates an I/O instruction that is issued by an I/O reconfiguration process and that is executed when the guest OS has returned from the suspended state, thereby to provide a new logical device configuration to the guest OS. According to one embodiment of the present invention, there is provided a device allocation changing method for changing a device allocation to a guest OS (operating system) in a virtual machine wherein an I/O (input/output) operation is executable by configuring a device either to be directly operable from the guest OS or to be operable through I/O emulation. The method includes the steps of reconfiguring either a device (or a "direct allocation device," hereinbelow) as a device for being used under the I/O emulation or a device, the direct allocation device being originally configured to be directly operable from the guest OS, or a device (or a "emulator device," hereinbelow) for being used under the I/O emulation, the emulator device being originally configured to be directly operable from the guest OS; and transmitting a virtual suspend instruction from a VMM (virtual machine monitor) to the guest OS, the suspend instruction being for suspending execution of the guest OS by stopping a guest OS, and causing the VMM to execute a device allocation changing process that changes the allocation of the device after completion of a suspension process that suspends the guest OS.

In the method, the virtual suspend instruction may be transmitted by using a power control notification process of the VMM.

An I/O instruction related to an I/O re-configuration process of the guest OS that is executed when the guest OS has returned from a suspended state may be emulated by the VMM to configure a logical device after the device allocation change.

It may be that, as a device allocation change request to be made to the guest OS being executing, a physical device to be correlated a logical device and whether the physical device is set to be a direct allocation device or an emulator device is specified on the basis of each logical device to be configured; and the VMM receives the change request inclusive of data necessary for re-initialization of the correlated physical device, and executes the allocation change.

In a case where a device to be set as a direct allocation device may be included in the change request, when the device is allocated an other guest OS, the allocation change may be abnormally terminated.

A physical device different from the logical device before the configuration change may be allocated to the guest OS.

The logical device to be configured by VMM through the I/O emulation may be configured to be provided to the guest OS as a device of the same type as the emulator device that is allocated for emulation.

In the device allocation changing process, the VMM may initialize the physical device specified as a target of the allocation changing process by using the re-initialization data of the correlated to the physical device.

It may be that an address such as a MAC address or an IP address is settable for a network adapter.

Further, it may be that, in a re-initialization process of the device, a port ID is settable for a fiber channel adapter.

The expression "a device to be directly operable from the guest OS" in the above means that the I/O operation of the guest OS is executable by a CPU (central processing unit) without executing the emulation.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Embodiments of the present invention will be described herebelow with reference to the accompanying drawings.

First Embodiment

Figure 1:
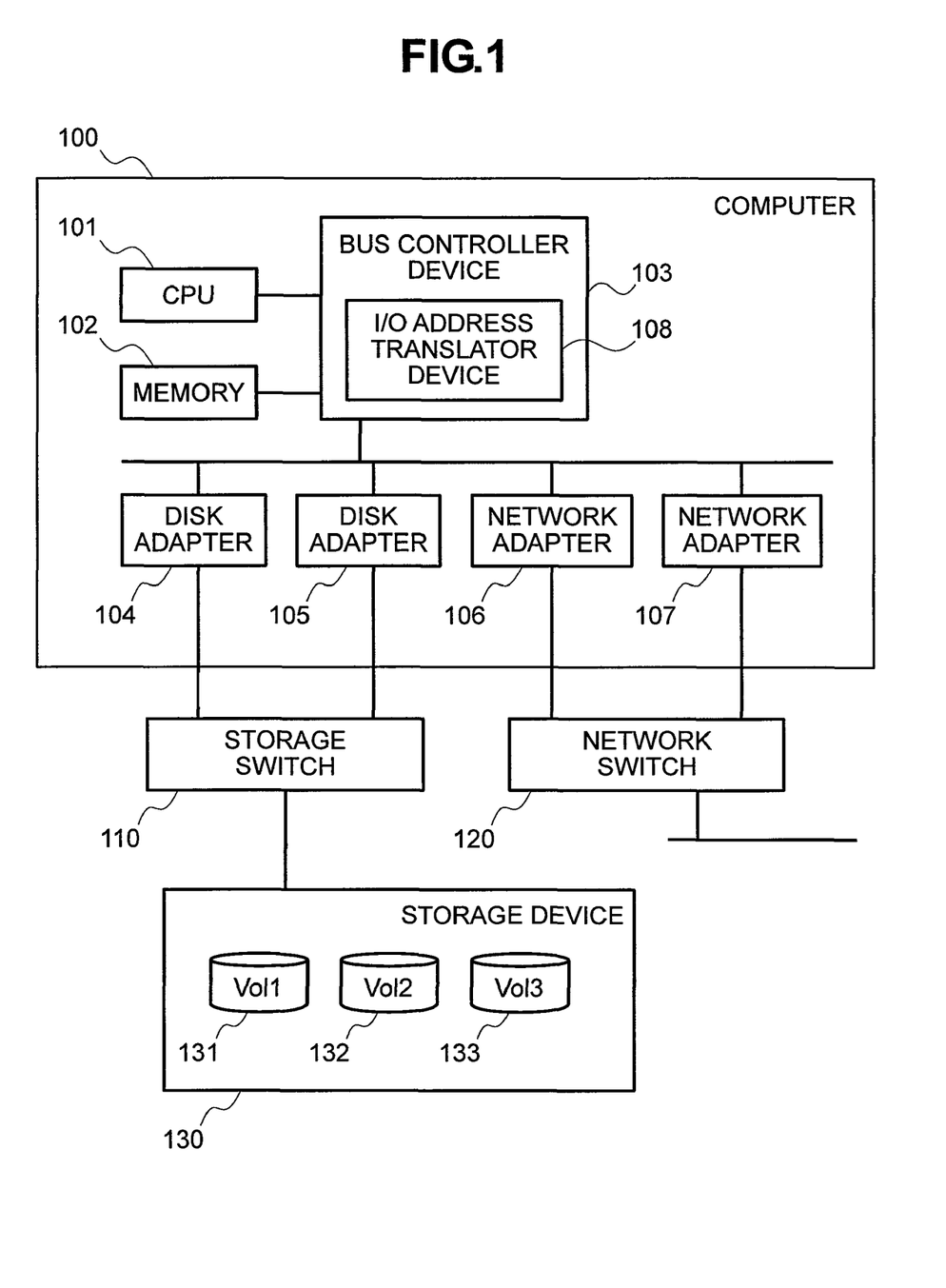
FIG. 1 is a view showing the configuration of a computer in a first embodiment of the present invention.

FIG. 1 is a view showing the configuration of a computer 100 in a first embodiment of the present invention. In the first embodiment, a description will be made for the purpose of illustrating a switching method that switches allocation of an I/O device to a respective guest OS (operating system) a direct mode and an emulation mode. The direct mode is a mode that enables direct access from the guest OS, and the emulation mode is a mode that enables use via emulation executed by a VMM (virtual machine monitor) from multiple guest OSs.

In the present embodiment, a cooperation between the VMM and the respective guest OS is realized by use of a power control function of the computer. The power control of the computer is standardized as ACPI (Advanced Configuration and Power Interface), and is implemented in a large number of computers and OSs. A process (suspend process) related to the power control included in the present embodiment is equivalent to process complying with ACPI.

The computer 100 is a computer having a general configuration in which an I/O bus connecting to which a CPU 101, a memory 102, and the I/O device connect is connected by a bus controller device 103. Further, disk adapters 104 and 105 and network adapters 106 and 107 are connected to the I/O bus. Further connected to the I/O bus are, for example, a keyboard, a display, and other devices, but such devices are not shown in the drawing. The number of devices to be connected is not limited to that shown in the drawing, but may be arbitrarily changed.

The disk adapters 104 and 105 are connected to a storage device 130 via a storage switch 110. The connection therebetween is a connection like a fiber channel, for example. Logical volumes 131 to 133 referenceable from the computer 100 via the disk adapters 104 and 105 are configured in the storage device 130. The guest OS executes by referencing the logical volumes 131 to 133.

The network adapters 106 and 107 are connected to a network switch 120. The connection therebetween is a connection like Ethernet, for example.

CPU 101 includes functions capable of realizing the virtual machine. The CPU 101 includes a privileged mode instruction and a non-privileged mode. In the privileged mode, all instructions such as those for I/O operation and control register access, for example; and in the non-privileged mode, limited instructions can be executed. In the event that, during execution in the non-privileged mode, the CPU 101 executes an instruction permitted only in the privileged mode, a trap is generated. In such an event, the CPU 101 transitions the execution mode into the privileged mode, and passes control to a trap handler that processes the trap.

The OS kernel, generally, executes in such a privileged mode, and performs overall control of the computer by using the privileged instruction of the CPU 101. A program that executes in a user mode executes in the non-privileged mode, and invokes a process of the kernel by shifting to the privileged mode when using a computer resource.

In the virtual machine environment, the VMM, which performs the overall control, executes in the privileged mode, and the OS kernel executes in the non-privileged mode under the control of the VMM. The VMM emulates privileged instructions, which the OS executes, in a trapping process, thereby realizing the virtual machine.

The bus controller device 103 includes an I/O address translator device 108 that translates an address of a destination of transfer of data to the memory 102 from the I/O device through DMA in correspondence to the I/O device of the transfer source. This enables the guest OS to directly use the I/O device.

Figure 2A:
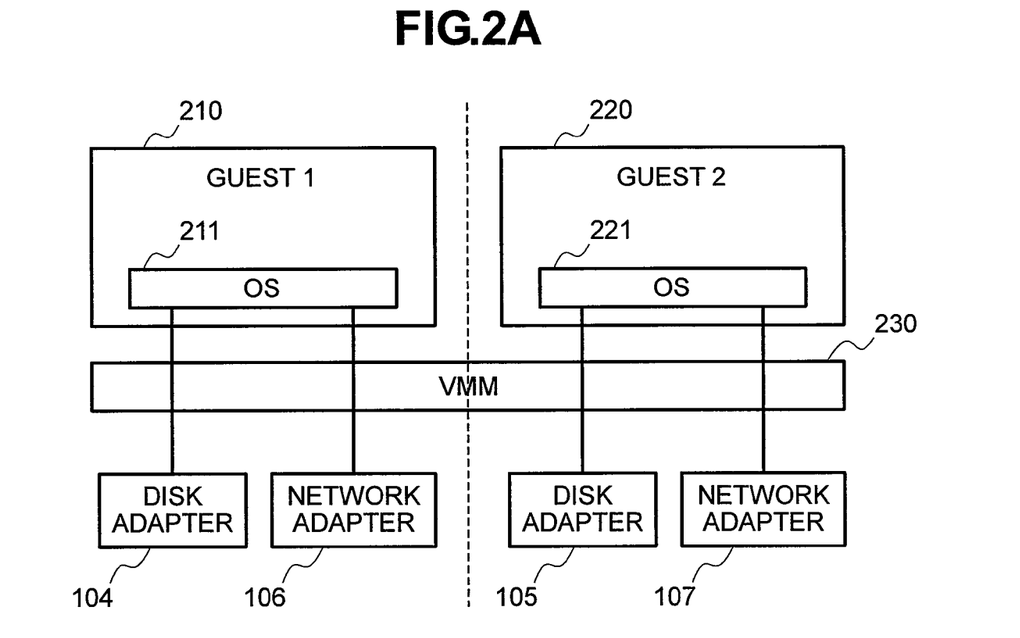
FIGS. 2A and 2B are views showing device allocation to guest OSs in the first embodiment of the present invention.
Figure 2B:
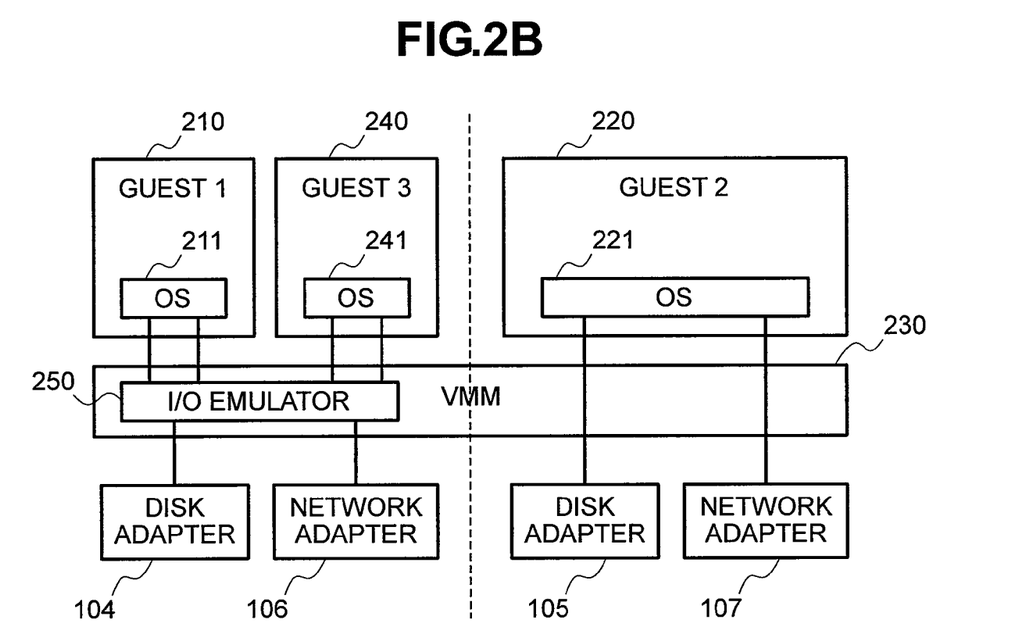

FIGS. 2A and 2B are schematic views showing differences in device allocation to guests.

FIG. 2A is a view showing the state in which the I/O device is allocated to guests in the direct mode. More specifically, two guests 210 and 220 (guests 1 and 2) execute in a virtual machine configured from the two guests 210 and 220 and a VMM 230. The VMM 230 sets up the I/O address translator device 108 in order that the guest 210 is enabled to directly use the disk adapter 104 and the network adapter 106 and the guest 220 is enabled to directly use the disk adapter 105 and the network adapter 107. Thereby, the VMM 230 executes the respective guest OSs 211 and 221. Further, when executing the guest 210, the VMM 230 configures the CPU 101 to not trap I/O instructions that are issued by the guest OS 211 to the disk adapters 104 and network adapter 106. The VMM 230 provides similar control when executing in the guest 220. An interrupt generated by a directly allocated device is captured by the VMM 230 and is then transmitted to a guest OS to which the device is allocated.

In this configuration, the I/O instruction issued to the device directly allocated to the guest is not trapped by the VMM 230, but is directly executed by the CPU 101. Hence, the amount of overhead is small, and guest OS executing with high reliability without being affected can be accomplished.

FIG. 2B shows the state in which some devices are allocated in the emulation mode. More specifically, there is shown the state in which the disk adapter 104 and the network adapter 106 are shared by the guests 210 and a guest 240 (guest 3) through emulation by an I/O emulator 250 of the VMM 230. In this case, the CPU 101 is configured to trap I/O instructions to the adapters 104 and 106, and then the guest 210 is executed. The VMM 230 captures the trap and causes the I/O emulator 250 to execute I/O processing. An interrupt from a device in this case is captured by the VMM 230, and the interrupt is processed by the I/O emulator 250, whereby a virtual interrupt is delivered to related guest OSs.

According to the present invention, transitions between the states of FIGS. 2A and 2B are realized without causing shutdown of the guest OSs. Configurations of the guest OS and the VMM for realizing the above state transitions will be described herebelow.

Figure 3:
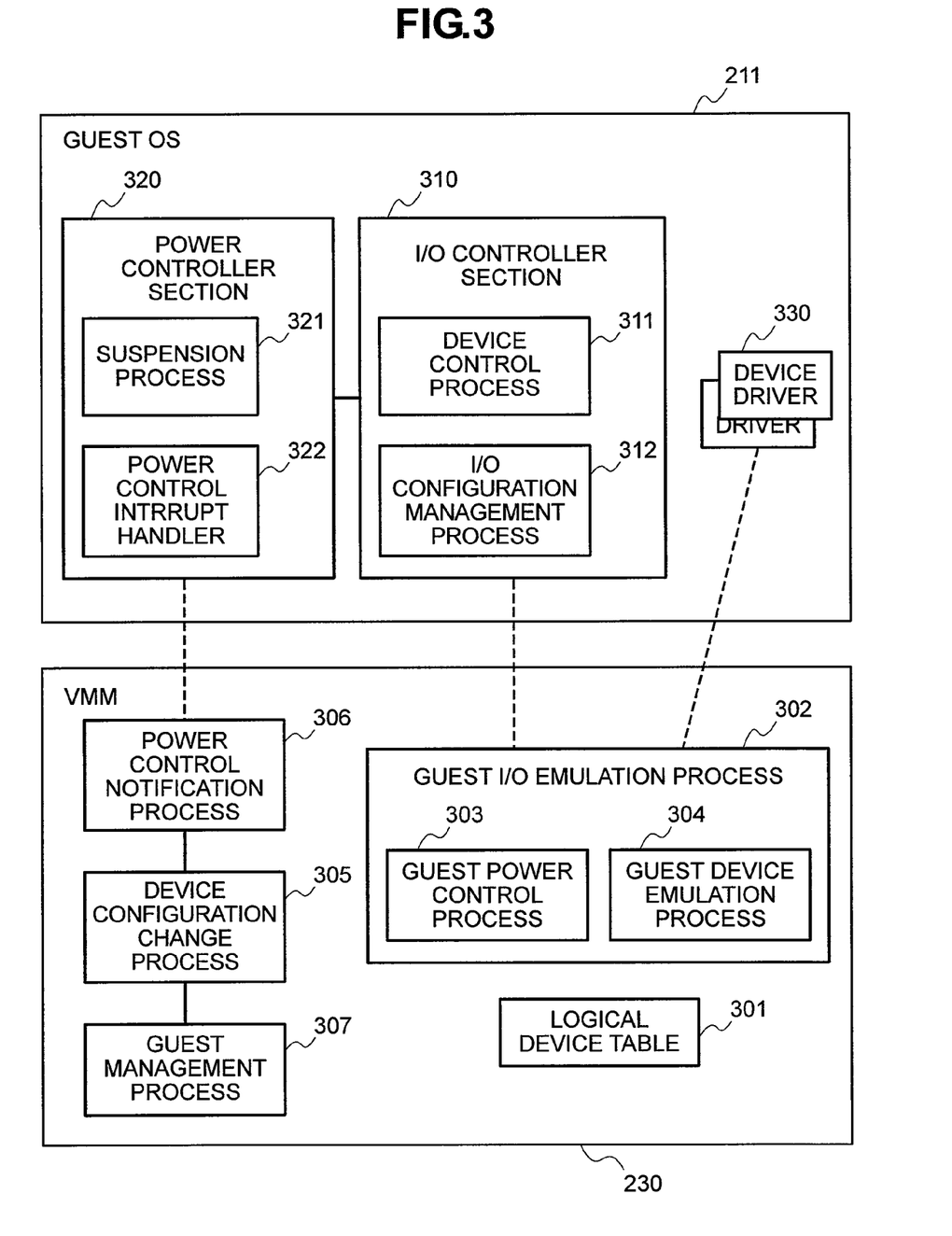
FIG. 3 is a view showing an interior configuration of a guest OS in the first embodiment of the present invention.

FIG. 3 shows the configurations of the VMM 230 and the guest OS 211 in the first embodiment of the present invention. It is assumed that the guest OS 211 supports ACPI.

The guest OS and the VMM are realized when software stored in the memory 102 is executed by the CPU 101.

Figure 4:
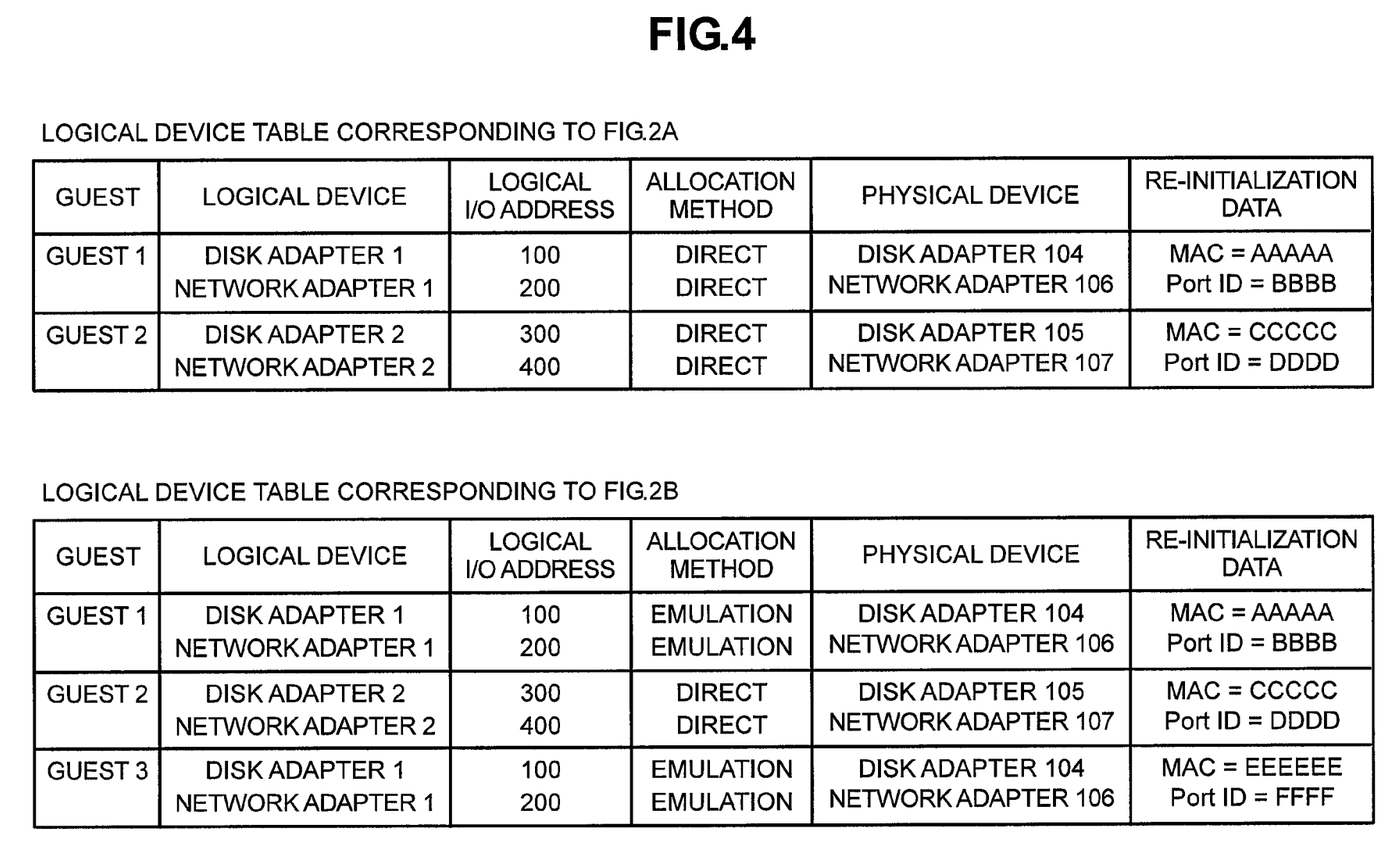
FIG. 4 is a view showing a logical device table in the first embodiment of the present invention.

First, the configuration of the VMM 230 will be described hereinbelow. A logical device table 301 retains configuration information of logical devices that the VMM 230 provides to the respective gests. Examples of logical device tables 301 are shown in FIG. 4. Information retained therein includes identification (ID) names of logical devices to be provided, logical I/O addresses allocated by the guest OSs to the logic devices, necessity/unnecessity of the I/O emulation process by the VMM 230, physical devices that causes actual I/O processing to be executed in the event of emulation, and re-initialization data. The re-initialization data will be described in latter paragraphs below.

While FIG. 4 shows two examples of logical device tables 301 respectively corresponding to the configurations shown in FIGS. 2A and 2B (the respective examples, hereinbelow, will be referred to as "example tables A and B"). For example, in the example table A, it is shown that the guest 1 requires a disk adapter 1 and a network adapter 1 as logical devices, and the disk adapter 104 and the network adapter 106 are allocated in the direct mode to respective ones of the adapters 1. On the other hand, it is shown that the guest 1 requires the disk adapter 1 and the network adapter 1 as logical devices, similarly as in the example table (A). In this case, however, it is shown that while the disk adapter 104 and the network adapter 106 are allocated to in the emulation mode, and the configuration is formed using I/O emulation that is executed by the VMM 230. In this case, when the guest OS 211 accesses, for example, I/O address "100" or "200," a trap is generated, and the VMM 230 executes the I/O emulation process.

Which one of the physical devices of the guest is to be correlated to which one of the logical devices is described in a configuration definition for the guest. The VMM 230 reads out configuration definitions for respective guests, thereby to create a logical device table 301 (the contents of the configuration definitions are not shown). The configuration definition may be created by a system administrator, or may be automatically created by a predetermined management program. The creation method for the configuration definition will not be discussed further in the present invention.

In accordance with the contents of the logical device table 301, the VMM 230 instructs the CPU 101 in the event of executing the guest whether to trap and emulate an I/O instruction that is to be executed by the guest OS 211. More specifically, there are provided setup for, for example, the contents to the control registers of the CPU 101 and setup for tables stored in the memory 102 which tables are referenced or accessed by the CPU 101. For example, in the example shown in FIG. 4B, the VMM 230 sets the CPU 101 to generate the trap since I/O emulation is necessary for accessing I/O addresses "100" and "200" of the guest 1. In addition, for example, the CPU 101 is set to not generate a trap so as to enable the I/O device to be directly operated for I/O addresses "300" and "400."

When the guest OS 211 executes an I/O instruction requiring the operation of an I/O device for which emulation is necessary, the CPU 101 generates a trap. Upon receipt of the trap, a guest I/O emulation process module 302 executes emulation of the I/O instruction that is executed by the guest OS 211. The guest I/O emulation process module 302 retains the states of the I/O devices associated with I/O operations of the respective guests, and issue real I/O processing to a physical device shown in the logical device table 301 by necessity, whereby the I/O processing is executed.

The I/O emulation process module 302 designates a target logical device in accordance with the reference I/O address, allocates the processing to a guest power control process module 303 and a guest device emulation process module 304, and emulates the I/O instruction.

The guest device emulation process module 304 emulates a logical device operation performed by the guest. The guest power control process module 303 executes processes, such as a power-off process and suspension/resumption process of the virtual machine by the guest OS. Such processes related to the present embodiment will be described further below.

A device configuration change process module 305 changes the configuration of the logical device that is to be presented visible to the guest. A power control notification process module 306 transmits a virtual suspend request interrupt to the guest OS 211 when the device configuration is changed. The power control notification process module 306 further executes the process of resuming the execution of the guest OS 211 from the suspended state.

A guest management process module 307 implements processes such as allocation of guest resources and guest activation/stopping.

The configuration of the guest OS 211 will now be described hereinbelow. A power controller module 320 includes a power control interrupt handler 322 and a suspension process module 321. The power control interrupt handler 322 executes a process upon receipt of an interrupt requesting changing of the power state of the computer. In the present example, a process is executed upon receipt of the virtual suspend request interrupt transmitted from the power control notification process module 306 of the VMM 230.

The suspension process module 321 includes procedure that interrupt the execution of the guest OS 211 in a state of power cut off to the I/O device and that resumes execution from that state.

An I/O controller module 310 controls the overall I/O resources of the computer. In this case, the I/O controller module 310 controls logical device resources created by the VMM 230. The I/O controller module 310 includes an I/O configuration management process module 312 and a device control process module 311 that performs on/off switching of devices. The I/O configuration management process module 312 executes, for example, enumeration of I/O devices connected to the computer, and allocation of I/O resources such as I/O addresses and interrupts for operation of the respective devices.

Figure 6:
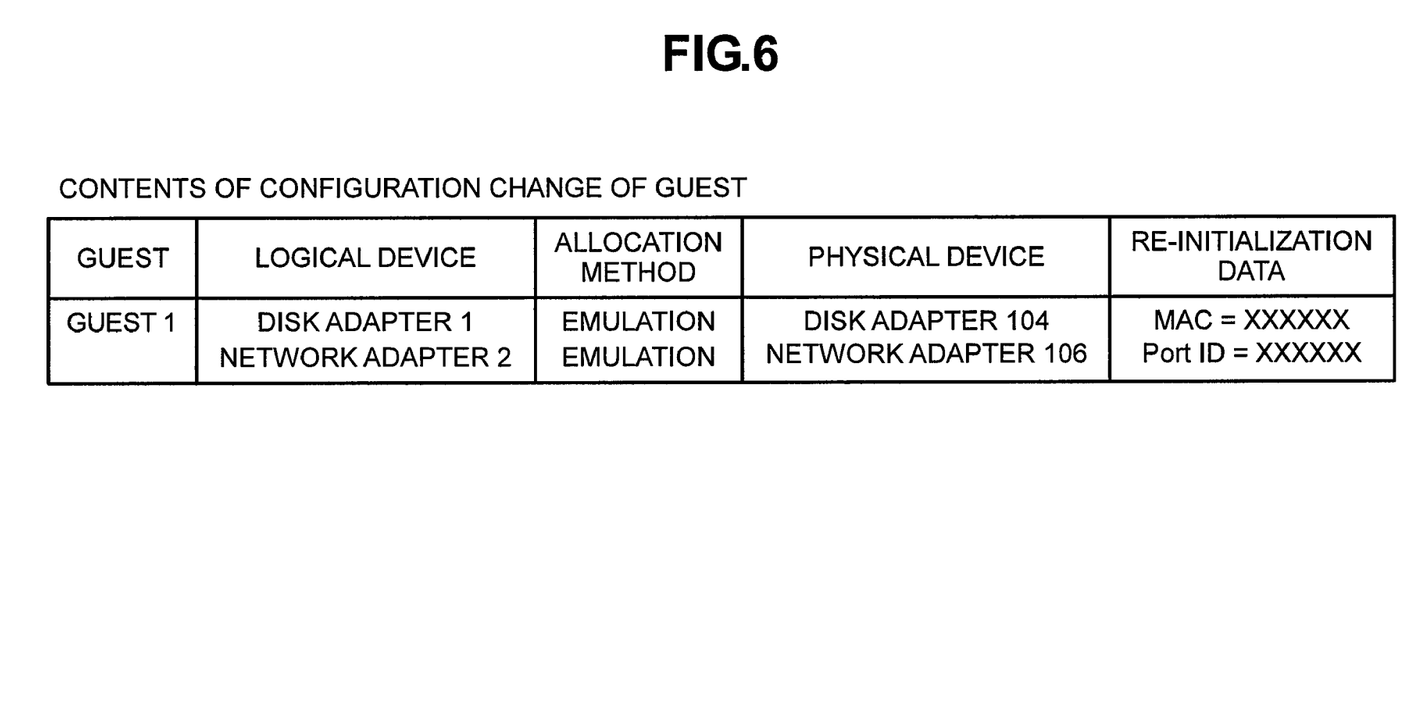
FIG. 6 is a view showing the contents of a device configuration change request in the first embodiment of the present invention.

A procedure of changing the I/O device allocation from the configuration shown in FIG. 2A to the configuration shown in FIG. 2B will be described herebelow. Description will be made on the assumption that a quest 240 is newly executed from the state shown in FIG. 2A. When having determined the guest 3 (guest 240) to execute in the computer 100, an administrator or a management program for the computer 100 transmits a configuration change request to the device configuration change process module 305 of the VMM 230 to change the respective devices directly allocated to the guest 1 (guest 210) to the emulation mode. The configuration change request is assumed to include logical device definition information of the guest 1 shown in FIG. 4B. For example, information as shown in FIG. 6 is included in the configuration change request (simply "change request," herebelow). The re-initialization data will be described in latter paragraphs below.

Figure 5:
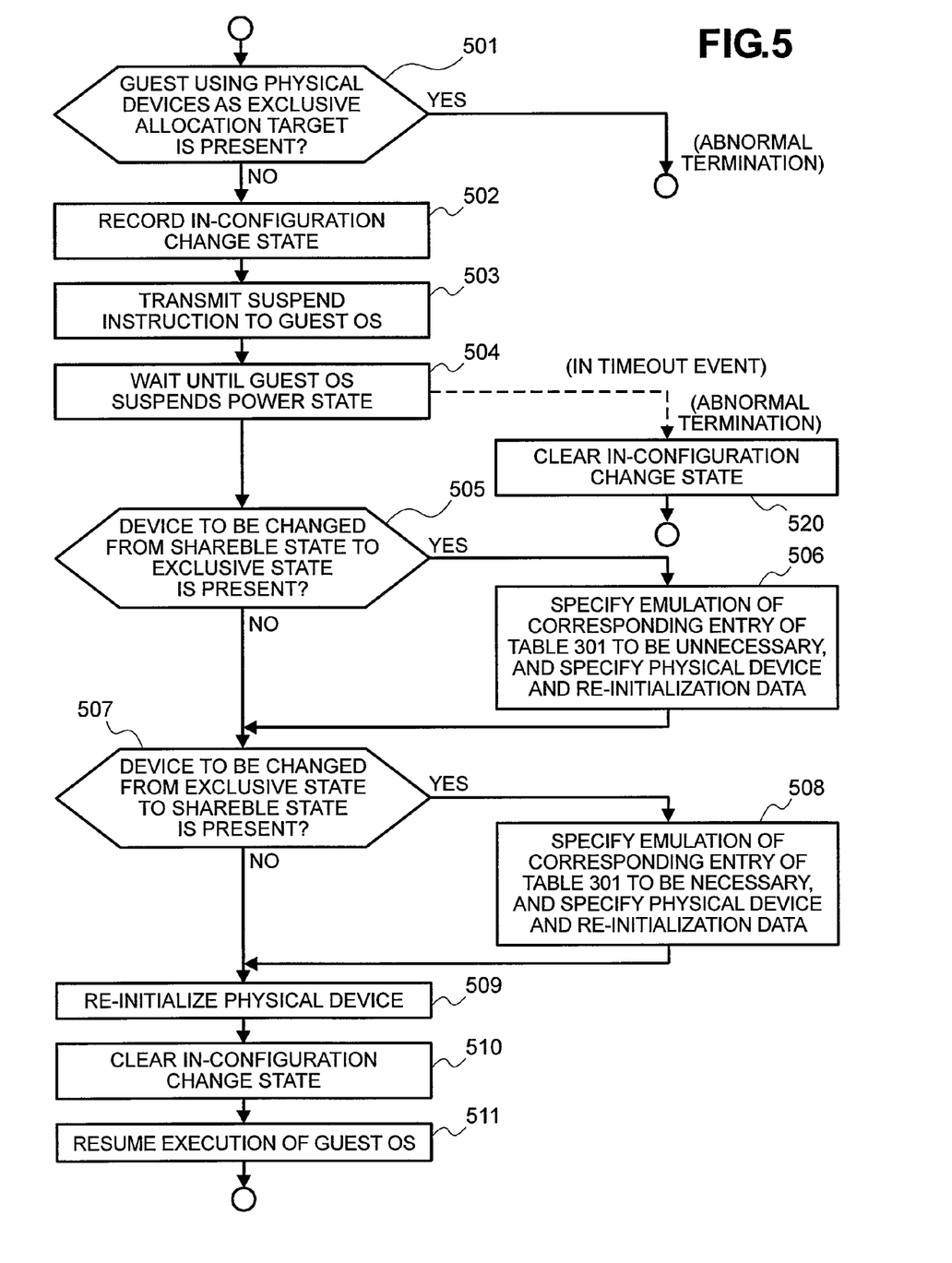
FIG. 5 is a processing flow diagram showing a device configuration change process in the first embodiment of the present invention.

A procedure of the device configuration change process module 305 will be described hereinbelow. FIG. 5 is a processing flow diagram of the process module 305.

First, in the event that a direct allocation(s) is included in the change request, it is verified by referencing the logical device table 301 whether a guest currently using a physical device corresponding to the allocation is present (at step 501). If a guest using the device is present, the process abnormally terminates (with error). In the event of direct allocation of a physical device, a corresponding guest OS currently using the device has to be stopped or the use of the device from the guest OS has to be stopped before effecting the configuration change. Processes relevant thereto will not be discussed in the present invention.

In the event that such a guest is not present, information indicative of an in-configuration change state is recorded in a predetermined address area of memory (at step 502). Then, a suspend request is transmitted from the power control notification process module 306 to the guest OS 211 (at step 503).

After the transmission of the request, the guest OS 211 process a suspend request and enters a state for wait (wait state) for execution of a suspension process that suspends the power state of the virtual machine (at step 504). The suspension process is realized through access to a predetermined I/O address corresponding to execution of power control. In the event that the guest has accessed the I/O address during the configuration change process, the guest power control process module 303 of the VMM 230 assumes that the suspension process of the guest OS 211 associated with the configuration change has been completed, and causes the process staying in the wait state at the step S504 to resume.

To be prepared for an event in which the guest OS 211 cannot transitions to the suspended state, the standby state at step 504 can be set to a timeout of a predetermined time period. If the wait is in a timeout event, a record of information indicative of configuration change is cleared (at step 520), and the configuration change process 305 abnormally terminates.

Generally speaking, in the event that a physical device is allocated to the guest OS 211 and is set to be directly operable from the guest OS 211, the VMM 230 is not able to know the operation state of the device. In the present invention, however, the process in the logical device of the guest OS 211 is already stopped at the time point the suspension process of the guest OS 211 has been completed, so that it can be guaranteed that no incomplete I/O operation remains. In the present example, the disk adapter 104 and the network adapter 106 are already stopped at the time point described above. Consequently, the logical device configuration can be changed at the time point described above.

At subsequent steps 505 to 508, the logical device table 301 is updated to specified contents. Subsequently, the physical device to be used by the guest OS 211 is re-initialized (at step 509). A physical device to be allocated to the guest OS 211 has to be of the type readily connectable to, for example, a logical volume in the storage device 130, network, or the like that is necessary for execution by the guest OS 211. Normally, an initialization process for connection to, for example, storage or network is executed in the OS activation event, and subsequent processes are dependent on the state established by the initialization process. Hence, in units of each physical device for which the configuration change occurs, the configuration change process module 305 executes a re-initialization process of the I/O device by combining together re-initialization data included in the change request and re-initialization data recorded in the logical device table 301. In this manner, the device configuration change process module 305 reinitializes the I/O device into the state connectable to resources that are used by the guest using the device.

Re-initialization data shown in the example for the network adapter 106 is a virtual MAC address of a network adapter that is provided to the guest OS 211, and re-initialization data shown in the example for the disk adapter 104 is a virtual Port ID of a virtual disk adapter that is provided to the guest OS 211. The process of providing setups of the respective adapters 106 and 104 is executed as the re-initialization process.

Finally, a flag indicative of the in-configuration change is cleared (at step 510), and the execution of the guest OS 211 is resumed (at step 511). The VMM 230 sets the execution of the guest OS 211 to resume from a specified address at which a return process for return from the suspended state is recorded, and schedules the execution of the guest OS 211.

Figure 7:
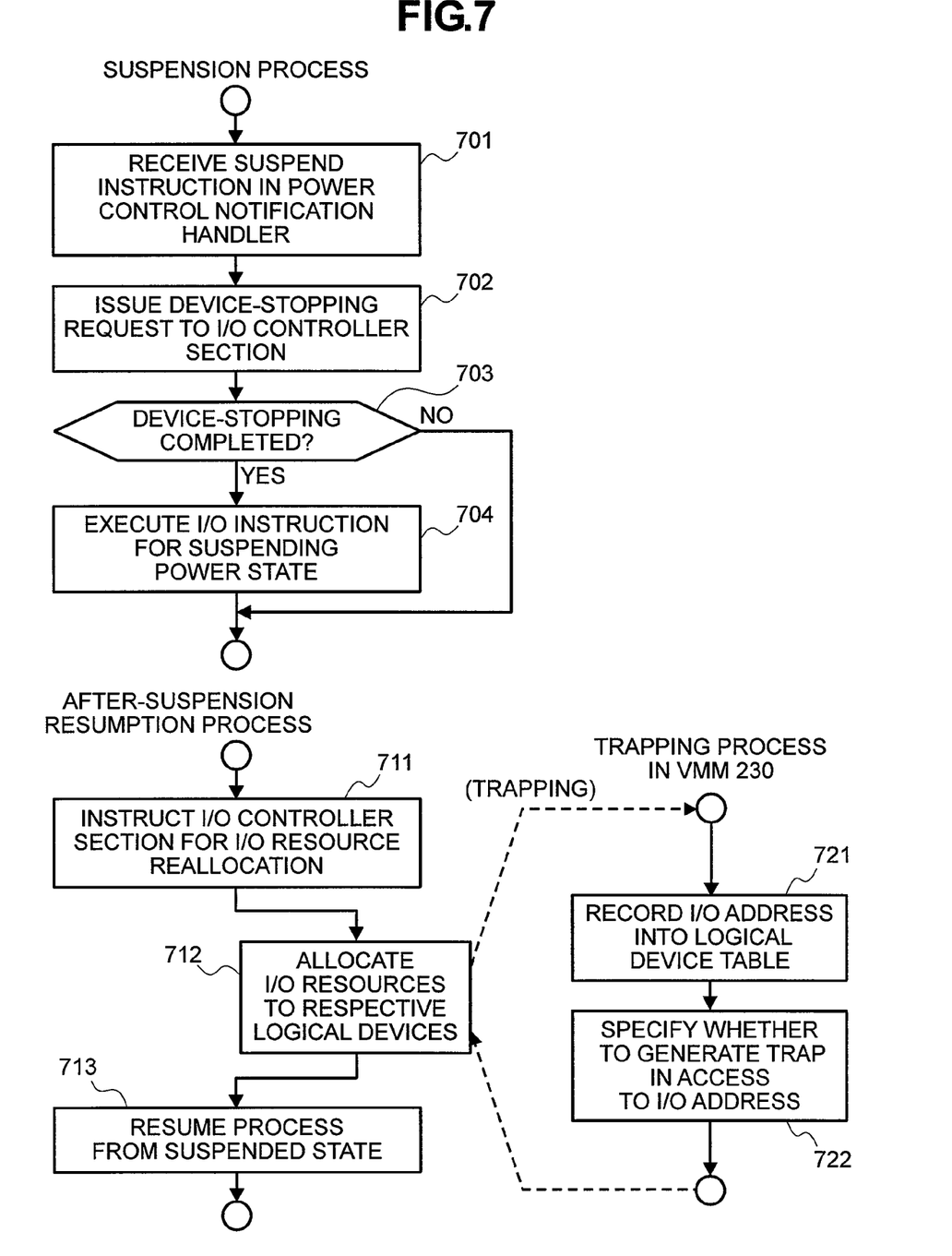
FIG. 7 is a processing flow diagram showing a device configuration change process procedure in the first embodiment of the present invention.

Next, procedure to be executed on the side of the guest OS 211 in cooperation with the configuration change process module 305 of the VMM 230 will be described herebelow. FIG. 7 is a flow diagram of processes that are executed in the guest OS 211.

First, a process of the suspend request interrupt transmitted from the VMM 230 will be described hereinbelow. At step 503 in the configuration change process, the VMM 230 transmits the suspend request of the suspend instruction as a virtual interrupt. With the request being received, the power control interrupt handler 322 of the guest OS executes (at step 701). The power control interrupt handler 322 issue a stopping request for all the devices to suspend the execution of the guest OS 211 to the device control process 311 (at step 702).

Upon receipt of the request, the device control process module 311 issues an instruction (stop-preparation instruction) to respective device drivers 330 of all the devices of the configuration to prepare for stopping the device operation. The respective device driver 330 provides setup to postpone the reception of I/O operations. In the event that an incomplete I/O operation is present, the device driver 330 waits until completion of the I/O operation, and causes a corresponding device into a stoppable state. When all the devices are brought into the stoppable states, the device control process 311 issues a stopping instruction to the devices. In the present example, the device control process module 311 issues the stop-preparation instruction and the stopping instruction to the device driver that controls the adapters 104 and 106.

However, depending on instruction timing a case can occur the device stopping (process) cannot be successfully accomplished. As such, at subsequent step 703, it is determined whether the device stopping process has been successfully completed. In the event of failure (step 703: NO), the suspension process terminates.

In the event that the stopping process has been successful, the power state of the computer is transitioned to a suspended state (at step 704). More specifically, a logical power-control I/O address defined by the VMM 230, thereby to cause the state of the virtual machine to a suspended state. The I/O operation in the guest OS 211 is trapped by the VMM 230, and the wait state at step 504 is cancelled. Thereafter, the guest OS 211 is not executed until return from the suspended state.

A resumption process for resumption from the suspended state will now be described hereinbelow. Generally speaking, in regard to the suspension process, the processing procedure is set up so that control shifts to the resumption process after resumption execution is resumed by the CPU 101 after return from the suspended state. In this case also, it is assumed that the processing procedure is set so that the processing from step 711 is executed after return from the suspended state.

First, the resumption process instructs the I/O configuration management process module 312 to reconfigure the I/O device setup (at step 711).

The I/O configuration management process module 312 enumerates I/O devices connected to the computer, and assigns the I/O resources such as I/O addresses to the respective devices (at step 712). This will be further described here with reference to an example case of reconfiguration of devices connected to PCI buses (PCI: peripheral component interconnect). According to the PCI bus specification, registers (configuration registers) located at I/O addresses predefined by the specification are accessed, and all devices connected to the PCI buses are enumerated, whereby the types of the devices and I/O resources necessary for the respective devices can be obtained. Further, similarly, by writing into spaces at specific I/O addresses, the I/O addresses for operating the devices connected to the PCI buses can be allocated to the devices.

The I/O configuration management process module 312 accesses the configuration registers or the PCI buses, thereby enumerating all the devices. In this event, since accesses to the configuration register are I/O instructions, the accesses are emulated by the VMM 230. The VMM 230 emulates the accesses to the configuration registers in accordance with the logical device table 301 as if logical devices defined for the guest 1 were present. For the logical devices for which the physical devices are allocated in the direct mode, information of the real physical devices are presented recognizably to the guest OS. Thereby, the I/O resource setup in the guest OS 211 can be implemented so that logical device accesses of the guest OS becomes direct accesses of the physical devices.

In the present example, it is assumed that the logical devices provided to the guest OS 211 are of the same types as the devices actually or really connected to the computer 100. As such, even when the method of allocation of the I/O devices is changed, the execution of the guest OS can be continued only through the change process of the I/O configuration, without changing the disk drivers that controls the devices, thus leading to no need of causing shutdown in the execution of the guest OS.

Upon completion of enumeration of all of the devices, the I/O configuration management process module 312 allocates the I/O resources, such as I/O addresses, to the respective devices. The I/O resources to be allocated are computed to prevent impingement between I/O resources in consideration of, for example, I/O addresses required by the devices and the configurations of other devices.

Also, the allocation of an I/O address to the device is the access to the configuration register, so that the allocation is emulated by the VMM 230. The VMM 230 obtains an I/O address allocated to an I/O device through a trap of an I/O instruction, and then records the address into the logical device table 301 (at step 721). Further, the VMM 230 determines whether a trap is generated in access to the allocated I/O address, and the CPU 101 is configured corresponding to the result of the determination (at step 722). Thereby, a trap is generated so that an I/O instruction for referencing a logical device for which a physical device is directly allocated is directly executed by the CPU 101, and an I/O instruction for referencing a logical device for which a device is allocated in the emulation mode is emulated by the VMM 230. In this event, also the I/O address translator device 108 is reset up. More specifically, the setup is provided so that a DMA transfer from a physical device set for the direct allocation is properly transferred into memory allocated to a guest OS that uses the device. Further, the setup is provided so that a destination of a DMA transfer of a device that is used in the I/O emulation a memory area under the management of the VMM 230.

In the present example, the setup is provided so that traps are generated in access to the logical addresses "100" and "200" allocated to logical devices, namely a disk adapter 1 and a network adapter 1.

After completion of the configuration change process of all the devices, the guest OS resumes from the process at the suspension event (at step 713).

In the manner described above, the allocation of the respective physical device to the logical device can be changed from the directly allocation to the emulation allocation. In the example, the respective device of the guest 1 can be changed from the directly allocation to the emulation allocation.

Figure 8:
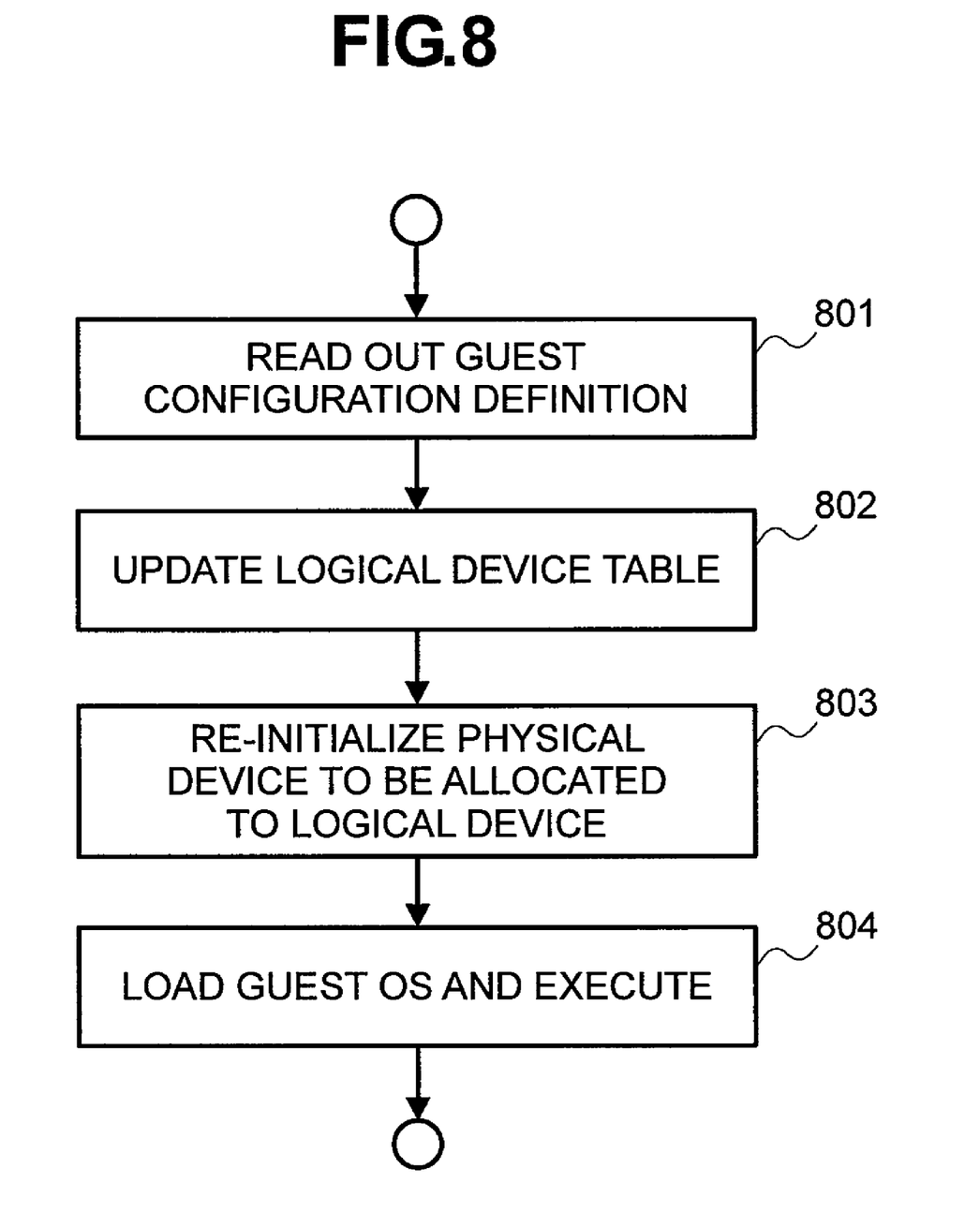
FIG. 8 is a processing flow diagram showing an activation procedure for activating the guest OS in the first embodiment of the present invention.

Next, a guest OS activation process will be described hereinbelow. In continuation from the above, the activation process will be described with reference to a case of activation of the guest 3. In order to activate the guest 3, a guest activation instruction is issued to the guest management process module 307 by use of guest configuration definition information of the guest 3 as a parameter(s). Subsequent guest activation processes are shown in FIG. 8.

First, the supplied guest configuration definition information is read out (at step 801). Then, configuration information of a logical device is set in the logical device table 301 (at step 802). At this time point, the contents of the table 301 are recognized as the configuration of FIG. 4B.

Subsequently, the re-initialization process of the physical device, which is allocated to the logical device of the guest 3 is executed (at step 803). Thereby, the resources necessary for the guest 3 can be accessed from the physical device. For example, the disk adapter 104 is used from the guests 1 and 3; the adapter 104 is re-initialized by use of respectively defined re-initialization data of the logical devices. This is similar for the network adapter 106. Finally, an image of the guest OS is loaded, thereby bringing the guest OS into a run-able state (at step 804).

In the manner described above, the device allocation is changed in order that the disk adapter 104 and the network adapter 106, which are directly used by the guest 1, and are used through I/O emulation executed by the VMM 230. Thereby, the devices can be allocated to the guests 1 and 3, and the guest OSs 211 and 241 can be executed.

In the process of loading at step 804, the image to be loaded is not necessarily an image that boots the guest OS. It may be that an image of the guest OS representing the state of the guest OS at one time point in execution thereof is loaded, and the execution of the guest OS from the time point is resumed. In this case, the configuration in the state at the time the execution of the guest is suspended can be formed so that the execution of the guest OS is resumed in the same manner as the process of return from the suspended state.

Further, the image at one time point may be an image of a guest OS that has been executed in a different computer. The guest OS corresponding to the image is executable in a computer inasmuch as the computer includes a physical device from which a logical device is to be provided to the guest OS.

Further, the device allocation can be changed so that a physical device shared by multiple guest OSs through the emulation allocation is directly used by a single one of the multiple guest OSs. In this case, first, it is necessary either to change the device configuration of the guest OS using a corresponding physical device or to stop the guest OS. Thereafter, the configuration is set up so that the physical device is directly allocated to the guest OS through the configuration change process module 305.

In the manner described above, the allocation of a physical device to a logical device that is to be provided to a guest OS can be changed or switched between the direct allocation and the emulation allocation without causing shutdown in the execution of the guest OS.

Thereby, control can be implemented in the manner that physical devices are allocated to a guest OS as long as the resources of the computer and the configuration of the guest OS permit, in which, when the resource allocation condition has becomes severe, the device allocation is switched from the direct mode to the emulation mode.

Conversely to the above, control can be implemented in the manner that the number of I/O devices are increased in a computer, in which, when the resource allocation condition is relaxed, a physical device is directly allocated to a guest OS for which higher performance is necessary.

Further, when a guest OS that was executing in a different computer is migrated, the device configuration is changed, whereby the device allocation configuration can be changed to enable the execution of the guest OS. Conversely, the device configuration can be changed in the migration source. Thereby, reliability and availability in the overall system configured to include multiple guest OSs can be improved.

Second Embodiment

A second embodiment of the present invention will be described hereinbelow. In the first embodiment, the method of changing the modes of allocation of the device to logical device of the guest has been described. In the second embodiment, a method of changing the physical device to the logical device of the guest will be shown and described.

Figure 9A:
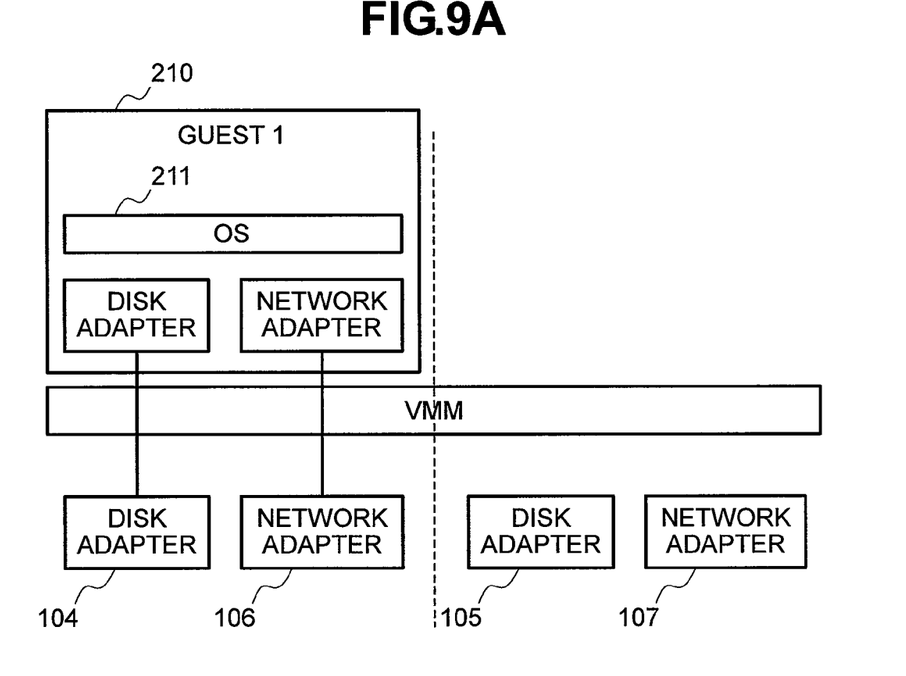
FIGS. 9A and 9B are views showing device allocation to the guest OS in a second embodiment of the present invention.
Figure 9B:
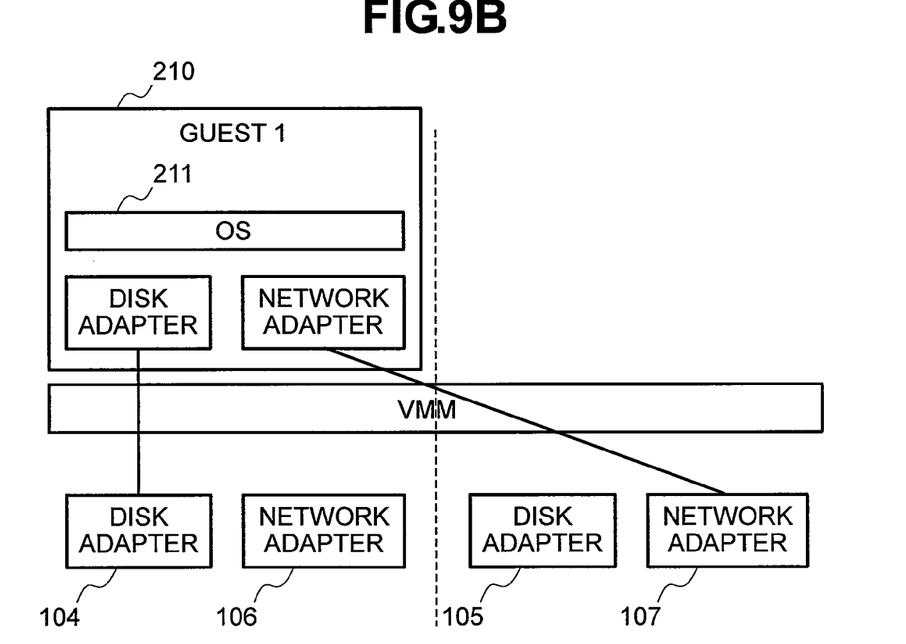

FIGS. 9A and 9B are schematic views showing device allocation to the guest in the second embodiment.

FIG. 9A shows that the guest OS 211 executes in the guest 210, in which adapters 104 and 106 are directly allocated as devices. It is assumed that adapters 105 and 107 are, respectively, unused devices of the same types as the adapters 104 and 107, and are physically connected to be connectable to, for example, a logical volume and network used by the guest OS 211.

It is now assumed that a failure has occurred in the network adapter 106. According to the present embodiment, the network adapter 106, which is allocated to the guest 210, can be changed to the network adapter 107.

More specifically, first, a configuration change request similar to that shown in FIG. 6 is created. The contents of the configuration change request is such that a physical device corresponding to a network adapter 1 is set to the network adapter 107, a physical device corresponding to a disk adapter 1 is set to the disk adapter 104, and the respective allocation methods are set to be exclusive (exclusive mode). For re-initialization data, data necessary to connect to resources that are referenced or accessed by the guest OS 211 is specified. A method of creating the configuration change request will not be discussed in the present invention.

The configuration change request is used to request the configuration change process module 305 of the VMM 230 for the configuration change. Similarly as in the first embodiment, the configuration change process module 305 processes the configuration change request. More specifically, during the suspended state of the guest OS 211, the devices are re-initialized by updating the contents of the logical device table 301, and the new device configuration is reflected into the guest OS 211 through the emulation process (the I/O reconfiguration process) of an after-suspension resumption process. In the manner described above, devices allocated to a guest OS can be changed to different devices without causing shutdown of the guest OS.

In the present embodiment, while the unused or free devices are allocated, devices being allocated to an other guest can be allocated to the guest OS. In the case, the process can be executed to add new logical devices for emulation of the devices through updating and device re-initialization of the logical device table 301 in the suspended state of the guest.

Thereby, a faulty device, for example, is excluded from allocations to the guest OS, and the faulty device can be replaced. This enables the replacement of such a faulty device without causing shutdown of the guest OS, consequently making it possible to improve availability in the system.

The device changing method according to the second embodiment can be used as a method that enhances flexibility in the configuration of a system using a virtual machine and that improves reliability and availability in the overall system.

According to the present invention, allocation of an I/O device presented visible to a guest OS can be changed during execution of the guest OS. In particular, even when a device is allocated to be directly usable by a guest OS, the device allocation configuration can be changed. Thereby, the allocation method can be switched between the mode of direct allocation, in which an I/O device can be directly operated, and the mode of emulation allocation, in which an I/O operation is executed through emulation by the VMM during execution of the guest OS.

Although the present invention and its advantages have been described in detail, it should be understood that various changes, substitutions, and alterations can be made without departing from the spirit and scope of the invention.

FIG. 1
100 Computer
101 CPU
102 Memory
103 Bus Controller Device
104, 105 Disk Adapter
106, 107 Network Adapter
108 I/O Address Translator Device
110,120 Network Switch
130 Storage Device
FIG. 2A
210 Guest 1
220 Guest 2
104, 105 Dist Adapter
106, 107 Network Adapter
FIG. 2B
210 Guest 1
220 Guest 2
240 Guest 3
104, 105 Disk Adapter
106, 107 Network Adapter
250 I/O Emulator
FIG. 3
211 Guest OS
310 I/O Controller Section
311 Device Control Process
312 I/O Configuration Management Process
320 Power Controller Section
321 Suspension Process
322 Power Control Interrupt Handler
330 Device Driver
230 VMM
306 Power Control Notification Process
305 Device Configuration Change Process
307 Guest Management Process
302 Guest I/O Emulation Process
303 Guest Power Control Process
304 Guest Device Emulation Process
301 Logical Device Table
FIG. 4

| | | LOGICAL DEVICE TABLE CORRESPONDING TO FIG. 2A | | | |
|---|---|---|---|---|---|
| GUEST | LOGICAL DEVICE | LOGICAL I/O ADDRESS | ALLOCATION METHOD | PHYSICAL DEVICE | RE-INITIALIZATION DATA |
| GUEST 1 | DISK ADAPTER 1 | | DIRECT | DISK ADAPTER 104 | |

LOGICAL DEVICE TABLE CORRESPONDING TO FIG. 2A

| GUEST | LOGICAL DEVICE | LOGICAL I/O ADDRESS | ALLOCATION METHOD | PHYSICAL DEVICE | RE-INITIALIZATION DATA |
|---|---|---|---|---|---|
|  | NETWORK ADAPTER 1 |  | DIRECT | NETWORK ADAPTER 106 |  |
| GUEST 2 | DISK ADAPTER 2 |  | DIRECT | DISK ADAPTER 105 |  |
|  | NETWORK ADAPTER 2 |  | DIRECT | NETWORK ADAPTER 107 |  |

LOGICAL DEVICE TABLE CORRESPONDING TO FIG. 2B

| GUEST | LOGICAL DEVICE | LOGICAL I/O ADDRESS | ALLOCATION METHOD | PHYSICAL DEVICE | RE-INITIALIZATION DATA |
|---|---|---|---|---|---|
| GUEST 1 | DISK ADAPTER 1 |  | EMULATION | DISK ADAPTER 104 |  |
|  | NETWORK ADAPTER 1 |  | EMULATION | NETWORK ADAPTER 106 |  |
| GUEST 2 | DISK ADAPTER 2 |  | DIRECT | DISK ADAPTER 105 |  |
|  | NETWORK ADAPTER 2 |  | DIRECT | NETWORK ADAPTER 107 |  |
| GUEST 3 | DISK ADAPTER 1 |  | EMULATION | DISK ADAPTER 104 |  |
|  | NETWORK ADAPTER 1 |  | EMULATION | NETWORK ADAPTER 106 |  |

FIG. 5

501 Guest using Physical Device as Exclusive Allocation Target is Present?

エラー終了 (Abnormal Termination)

502 Record In-Configuration Change State

503 Transmit Suspend Instruction to Guest OS

504 Wait Until Guest OS Suspends Power State

タイムアウトの場合 (In Timeout Event)

エラー終了 (Abnormal Termination)

505 Device to be Changed from Sharable State to Exclusive State is Present?

506 Specifiy Emulation of Corresponding Entry of Table 301 to be Unnecessary, and Specify Physical Device and Re-Initialization Data 507 Device to be Changed from Exclusive State to Sharable state is Present?

508 Specify Emuation of Corresponding Entry of Table 301 to be Necessary, and Specify Physical Device and Re-Initialization Data 509 Re-Initialize Physical Device 510 Clear In-Configuration Change State 511 Resume Execution of Guest OS 520 Clear In-Configuration Change State

FIG. 6

| CONTENTS OF CONFIGURATION CHANGE OF GUEST | | | | |
|---|---|---|---|---|
| GUEST | LOGICAL DEVICE | ALLOCATION METHOD | PHYSICAL DEVICE | RE-INITIALI-ZATION DATA |
| GUEST 1 | DISK ADAPTER 1 NETWORK ADAPTER 2 | EMULATION EMULATION | DISK ADAPTER 104 NETWORK ADAPTER 106 |  |

FIG. 7

サスペンド処理 Suspension Process

701 Receive Suspend Instruction in Power Control Notification Handler

702 Issue Device-Stopping Request to I/O Controller Section

703 Device-Stopping Completed?

704 Execute I/O Instruction for Suspending Power State

VMM230 のトラップ処理 Trapping Process in VMM 230

サスペンド再開処理 After-Suspension Resumption Process

711 Instruct I/O Controller Section for I/O resource Reallocation

712 Allocate I/O resources to Respective Logical Devices
トラップ (Tapping)
713 Resume Process from Suspended State
721 Record I/O Address into Logical Device Table
722 Specify Whether to Generate trap in Access to I/O Address
FIG. 8
801 Read Out Guest Configuration Definition
802 Update Logical Device Table
803 Re-Initialize Physical Device to be Allocated to Logical Device
804 Load Guest OS and Execute
FIG. 9A, 9B
ゲスト 1 Guest 1
ディスクアダプタ Disk Adapter
ネットワークアダプタ Network Adapter

What is claimed is:

1. In a computer system comprising a guest operating system (OS), at least one physical device, and a virtual machine monitor (VMM) which emulates the physical device as a logical device and switches the access target of the OS between the physical device and the logical device, a method comprising steps of:
    transmitting a virtual suspend instruction for temporarily suspending the execution of the OS from the VMM to the OS;
    after receiving notification that the OS completed the suspension of the execution, the VMM executing an access target changing process for switching the access target of the OS between the physical device and the logical device;
    when switching the access target of the OS from the physical device to the logical device, the VMM allowing the OS to access the logical device; and
    when switching the access target of the OS from the logical device to the physical device, the VMM allowing the OS to directly access the physical device corresponding to the logical device.

2. The method according to claim 1, wherein the virtual suspend instruction is transmitted by a power control notification process of the VMM.

3. The method according to claim 2, wherein an I/O instruction related to an I/O re-configuration process of the guest OS that is executed when the guest OS has returned from a suspended state is emulated by the VMM to configure a logical device after the device allocation change process.

4. The method according to claim 1, wherein
    on switching the access target of the OS from the physical device to the logical device, the VMM receives a device allocation change request including the name of the logical device allocation method, the name of the physical device, or re-initialization data.

5. The method according to claim 4, wherein, in a case where a device to be set as a direct allocation device is included in the change request, when the device is allocated another guest OS, the allocation change process is abnormally terminated.

6. The method according to claim 4, wherein a physical device different from the logical device before the configuration change process is allocated to the guest OS.

7. The method according to claim 4, wherein the logical device to be configured by VMM through the I/O emulation is configured to be provided to the guest OS as a device of the same type as the emulated device that is allocated for emulation.

8. The method according to claim 4, wherein, in the device allocation changing process, the VMM executes initializing process that initializes the physical device specified as a target of the allocation changing process by using the re-initialization data of the correlated to the physical device.

9. The method according to claim 8, wherein in a re-initialization process of the device, an address such as a MAC address or an IP address is settable for an network adapter.

10. The method according to claim 8, wherein in a re-initialization process of the device, a port ID is settable for a fiber channel adapter.

* * * * *